United States Patent
Fu et al.

(10) Patent No.: US 9,542,223 B2
(45) Date of Patent: *Jan. 10, 2017

(54) SCHEDULING JOBS IN A CLUSTER BY CONSTRUCTING MULTIPLE SUBCLUSTERS BASED ON ENTRY AND EXIT RULES

(71) Applicant: International Business Machines Corporation, Armonk, NY (US)

(72) Inventors: Zhi Wen Fu, Beijing (CN); Zi Ming Hu, Beijing (CN); Peng Liu, Beijing (CN); Jie Yang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 115 days.

This patent is subject to a terminal disclaimer.

(21) Appl. No.: 14/153,779

(22) Filed: Jan. 13, 2014

(65) Prior Publication Data

US 2014/0130057 A1  May 8, 2014

Related U.S. Application Data

(63) Continuation of application No. 12/713,740, filed on Feb. 26, 2010, now Pat. No. 8,631,410.

(51) Int. Cl.
*G06F 9/46* (2006.01)
*G06F 9/50* (2006.01)
*H04L 29/08* (2006.01)

(52) U.S. Cl.
CPC ............ *G06F 9/50* (2013.01); *G06F 9/505* (2013.01); *G06F 9/5044* (2013.01); *G06F 9/5077* (2013.01); *H04L 67/1002* (2013.01)

(58) Field of Classification Search
CPC ........... G06F 9/4881; G06F 9/505; G06F 9/50

USPC .......... 718/103, 102; 709/223, 220; 714/11
See application file for complete search history.

(56) References Cited

U.S. PATENT DOCUMENTS

| 5,450,535 A | 9/1995 | North | |
|---|---|---|---|
| 6,437,804 B1* | 8/2002 | Ibe | G06F 17/509 709/223 |
| 7,065,764 B1* | 6/2006 | Prael | G06F 9/5072 703/2 |
| 7,284,244 B1* | 10/2007 | Sankaranarayan | G06F 9/5027 718/103 |

(Continued)

OTHER PUBLICATIONS

Lim, Ae-Ri et al., "Hierarchical Access Scheme Based on Adjustable Maximum Transmission Power Level in Wireless Ad Hoc Networks", Publication of IEEE Vehicular Technology Conference, V. 58 No. 5 2003, 5 pages.

(Continued)

*Primary Examiner* — Aurel Prifti
(74) *Attorney, Agent, or Firm* — DeLizio Law, PLLC (57) ABSTRACT

Jobs are scheduled in a cluster comprising multiple computing nodes. The scheduling of jobs includes defining rules for constructing virtual sub-clusters of the multiple computing nodes. The multiple nodes in the cluster can be placed into multiple virtual sub-clusters based on the rules, wherein one computing node can only be included in one virtual sub-cluster. A job is received and dispatched to a selected virtual sub-cluster. At least one computer node is scheduled for the dispatched job in the selected virtual sub-cluster. Further, the job is dispatched to the selected virtual sub-cluster based on characteristics of the job and/or characteristics of virtual sub-clusters.

20 Claims, 6 Drawing Sheets

(56) References Cited

U.S. PATENT DOCUMENTS

| | | | | |
|---|---|---|---|---|
| 7,287,180 | B1* | 10/2007 | Chen | G06F 11/2033 |
| | | | | 714/11 |
| 7,478,050 | B1* | 1/2009 | Togawa | G06Q 10/06 |
| | | | | 705/7.13 |
| 8,055,735 | B2* | 11/2011 | Krishnappa | G06F 15/16 |
| | | | | 709/220 |
| 2002/0116437 | A1 | 8/2002 | Kambara et al. | |
| 2006/0212740 | A1* | 9/2006 | Jackson | G06F 9/5027 |
| | | | | 714/4.1 |
| 2007/0229896 | A1* | 10/2007 | Fujimori | G06F 3/1205 |
| | | | | 358/1.16 |
| 2009/0031312 | A1 | 1/2009 | Mausolf et al. | |
| 2009/0125620 | A1* | 5/2009 | Klincewicz | H04L 41/048 |
| | | | | 709/223 |
| 2009/0158286 | A1* | 6/2009 | Carteri | G06F 9/5038 |
| | | | | 718/102 |
| 2010/0083253 | A1 | 4/2010 | Kushwaha | |
| 2015/0082314 | A1* | 3/2015 | Suzuki | G06F 9/54 |
| | | | | 718/102 |
| 2015/0121391 | A1* | 4/2015 | Wang | G06F 9/5044 |
| | | | | 718/104 |

OTHER PUBLICATIONS

"U.S. Appl. No. 12/713,740 Final Office Action", Oct. 5, 2012, 33 pages.

"U.S. Appl. No. 12/713,740 Office Action", Apr. 20, 2012, 24 pages.

\* cited by examiner

SCHEDULING JOBS IN A CLUSTER BY CONSTRUCTING MULTIPLE SUBCLUSTERS BASED ON ENTRY AND EXIT RULES

RELATED APPLICATIONS

This application is a Continuation of and claims the priority benefit of U.S. application Ser. No. 12/713,740 filed Feb. 26, 2010.

FIELD

The disclosure generally relates to the scheduling of computing resources, and more particularly to scheduling jobs in a cluster and related system.

BACKGROUND

A computer cluster, referred to cluster for short, is a type of computer system which completes computing jobs by means of multiple collaborative computers (also known as computing resources such as software and/or hardware resources) which are connected together. These computing resources in a same management domain have a unified management policy and provide services to users as a whole. A single computer in a cluster system is usually called a node or a computing node.

The cluster system has many advantages. For example, the cluster system, when working in a load-balance manner, can achieve a higher efficiency through performing a same work by multiple computers. The cluster system may also work in a master/slave server manner. Once a master server fails, a slave server can provide services to users in substitute of the master server, thereby exhibiting a high fault-tolerance.

Corresponding computing resources should be allocated to a computing job to be implemented, since the cluster system comprises a great many of computing resources. The process is referred as job scheduling in a cluster environment. The job scheduling is actually a process for mapping jobs to corresponding resources for execution based on characteristics of the jobs and resources according to scheduling policies In brief, the computing jobs are requesting resources and utilizing them. Traditional computing jobs are mainly related to high performance computing applications such as weather forecast, landform analysis and other similar large-scale science issues. Along with the pervasions of computer techniques in various fields, computations are increasingly demanded in some new fields such as on-line gaming, banking business, EDA designs and so on.

The computing jobs in such new fields are dramatically different from those in traditional academic institution. For example, traditional computing jobs mainly comprise a small number of jobs which are time-consuming and computing-intensive. Such jobs are essentially of same type (either serial or parallel). The computing jobs in the new fields are relatively complicated and have different requirements. They often' comprise a large number of light-weighted jobs of which the types vary all the time, for example, the types can cover serial/parallel, real time/non-real time and so on.

Furthermore, the rapid development of computer techniques makes computing resource environments more complicated and the scale of a cluster larger. As an example, there may be millions of computing nodes in a cluster. The development of semiconductor techniques reduces the cost of hardware, which leads to a huge number of computing resources; for example, the numbers of CPUs, memories, IO devices and the like are increased significantly than before. Moreover, topology structures of computing resources develop from the original flat structure to complicated structures with layers, dimensions and etc. Additionally, the types of computer hardware and software increase steadily. In terms of hardware, servers for example include IBM x series, p series, BlueGene and etc. As to software, operation systems for instance include AIX, Linux, and Windows and etc.

Figure 1:
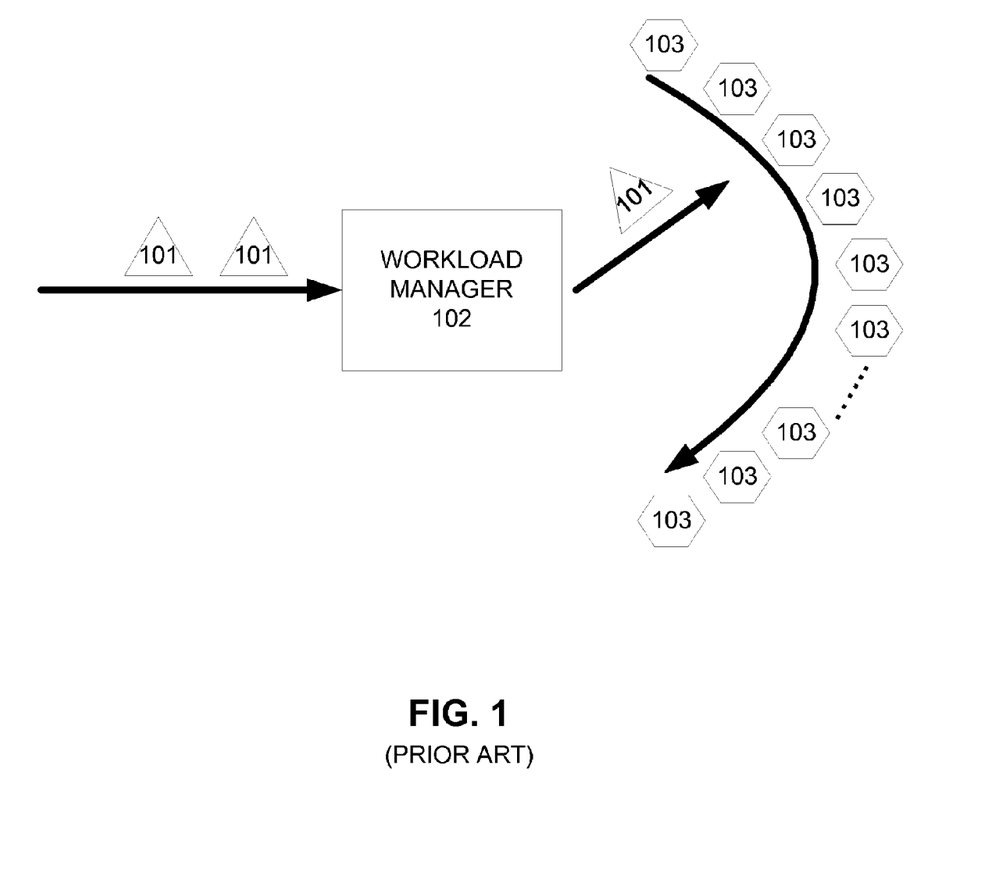
FIG. 1 shows a typical scheduling approach employed in a single cluster scheduling system.

FIG. 1 shows a typical scheduling approach employed in a single cluster scheduling system. As shown in FIG. 1, a job 101 in a job queue requests resources from a scheduler. A workload manager 102 in the scheduler walks through computing nodes 103 in computing resources to select a node set to be allocated to run the job. Then, the workload manager 102 will arranges the job 101 to run in the selected node set.

It can be seen from the above-mentioned scheduling approach that it is necessary to traverse many of nodes before identifying the one to allocate a job to when the job requests resources. This may be effective for a cluster system with a few of computing nodes. However, the scheduling efficiency is reduced markedly in a cluster scheduling system with a large number of computing nodes. Further, for some real time jobs (such as online gaming, banking business and the like), it is unacceptable to acquire the optimal solution with such a long time delay.

Additionally, as mentioned above, new types of computer hardware and software are continually developed. With current techniques, it is possible to produce large-scale computing nodes such as BlueGene or large Symmetric Multiple processing (SMP) computing node with 64 or even 128 CPUs, as well as low cost computing nodes such as blade servers.

Different types of computing nodes have different typical applicable situations and scheduling policies. As an example, a single node from large-scale computing nodes (such as Power server with 64 CPUs) has powerful computing, storage, and fault-tolerance capabilities and so forth. Moreover, it has plenty of various additional features such as Simultaneous Multiple Threads (SMT), affinity and the like. Therefore, in theory, large scale computing nodes can be shared by multiple medium and small-scale computing applications (for example, circuitry simulations, banking transaction processing and the like). Furthermore, such nodes are generally, expensive, and their scheduling policies particularly emphasize refinements in order to increase resource utilization, such as Backfill scheduling policy.

A single node from low cost computing nodes has relative inadequate computing, storage, fault-tolerance and other capabilities, as well as a small number of additional features. However, there are a great many such computing nodes due to the low cost, and their respective scheduling policies, such as round robin, tend to be unrefined.

In actual running, different applications have different requirements for resources, and even the same application may have different requirements in different execution phases. For example, a complete process of weather forecast application generally comprises pre-processing on raw data, calculating and some data post-processing. In the data pre-processing phase, the requirement for resources usually concentrates on IO performances. In the computing phase, the requirement for resources focuses on computing performances.

In view of the above factors, there may be different types of computing nodes in the same cluster. For instance, many actual clusters may be composed of multiple types of computing nodes, including those that are proficient at computing or IO performances, as well as the nodes with balanced performances.

SUMMARY

Accordingly, it is in need of a scheduling system which can improve the throughput of scheduling and is suitable for various computing nodes and application requirements, so as to enhance the scheduling efficiency and expand application field. To overcome the above one or more disadvantages existing in the prior art, the embodiments provide a method and system for scheduling a job in a cluster.

According to one aspect of the embodiments, there is provided a method for scheduling a job in a cluster which comprises multiple computing nodes, comprising: defining rules for constructing virtual sub-clusters of the multiple computing nodes; constructing the multiple nodes in the cluster into multiple virtual sub-clusters based on the rules, wherein one computing node can only be included in one virtual sub-cluster; dispatching a received job to a selected virtual sub-cluster; and scheduling at least one computing node for the dispatched job in the selected virtual sub-cluster.

According to another aspect of the embodiments, there is provided a system for scheduling a job in a cluster which comprises multiple computing nodes, comprising: a rule definer configured for defining rules for constructing virtual sub-clusters of the multiple computing nodes; a virtual sub-cluster manager configured for constructing the multiple nodes in the cluster into multiple virtual sub-clusters based on the rules, wherein one computing node can only be included in one virtual sub-cluster; a dispatcher configured for dispatching a received job to a selected virtual sub-cluster; and a sub-scheduler configured for scheduling at least one computing node for the dispatched job in the selected virtual sub-cluster.

With the solutions of the embodiments, many advantages can be achieved. For example, computing nodes in a cluster are constructed into multiple virtual sub-clusters according to embodiments. Obviously, the number of virtual sub-clusters is extremely less than the total number of computing nodes in a cluster, and thus jobs can be dispatched to virtual sub-clusters quickly for further processing. Also, the number of computing nodes in each virtual sub-cluster can be controlled at a suitable level, which can greatly increase the throughput of scheduling.

Further, a rapid dispatching can be performed based on characteristics of jobs and/or characteristics of each virtual sub-cluster, whereby different types of jobs can be dispatched to a virtual sub-cluster which is most suitable for the job so as to be scheduled. Moreover, each virtual sub-cluster can have its own scheduling policy, by which the scheduling efficiency and utilization of computing nodes can be further increased.

To sum up, the embodiments provide an approach for using flexible scheduling policies among computing nodes with different types by means of constructing virtual sub-clusters. Some embodiments can facilitate improving the throughput of job scheduling, extending the existing scheduling system to large-scale complicated clusters, and applying different scheduling policies flexibly to different types of applications and computing nodes.

BRIEF DESCRIPTION OF THE DRAWINGS

The features, advantages and other aspects will become more apparent in view of the following detailed description with reference to the drawings, in which.

It should be noted that, identical parts are indicated by identical reference numbers throughout all drawings, if present.

DESCRIPTION OF EMBODIMENT(S)

In the following detailed description, a number of specific details are illustrated as examples for fully understanding the embodiments. However, those skilled in the art should appreciate that the inventive subject matter can be implemented without these details. Further, for explaining the embodiments more clearly, in some examples, known methods, processes, elements and circuits are described in principle but not in detail. The embodiments will be explained and illustrated below in more detail with combination of drawings. It should be appreciated that the drawings and embodiments are for exemplification, but not to limit the protection scope of the inventive subject matter.

Considering that there may be different types of computing nodes in a same cluster, the scheduling efficiency will be impacted if a unified scheduling policy is used for different computing resources when jobs are scheduled in the cluster.

The above-mentioned weather forecast is taken as an example. In the pre-processing phase, it is unnecessary to use too many nodes, but the requirement for disk IO performances of nodes is extremely high. In the computing phase, although there are also requirements for disk IO performances, what are more important are the requirements for numerical calculations capabilities and network communication IO, as well as the number of nodes engaging in the computation.

Accordingly, in the pre-processing phase, jobs are often scheduled to be run by huge nodes with outstanding disk IO performances. In the computing phase, jobs are usually scheduled to be run by a large number of nodes which are good at numerical calculations.

However, the system uses an unified scheduling policy only, for example, applies the refined scheduling policy on a great many of nodes with low cost, which is often unnecessary and may lead to low efficiency. Consequently, it is desirable to improve the existing scheduling approaches when facing a modern complicated cluster environment which has a significantly-increased cluster scale and types of computing jobs.

In view of the current complicated cluster environment, there are many disadvantages in the prior art. Hence, some embodiments can increase the scheduling throughput effectively by constructing computing nodes in the cluster into multiple virtual sub-clusters. Further, the construction of virtual sub-clusters provides an approach for adopting scheduling policies among computing nodes flexibly. Each virtual sub-cluster has a scheduling policy suitable for itself so as to increase the scheduling efficiency.

In embodiments, users are not aware of such virtual sub-clusters. In other words, these virtual sub-clusters are transparent to users and hence called "virtual" sub-clusters. Obviously, it can be appreciated by those skilled in the art that the virtual sub-clusters may be not transparent to users as well.

Figure 2:
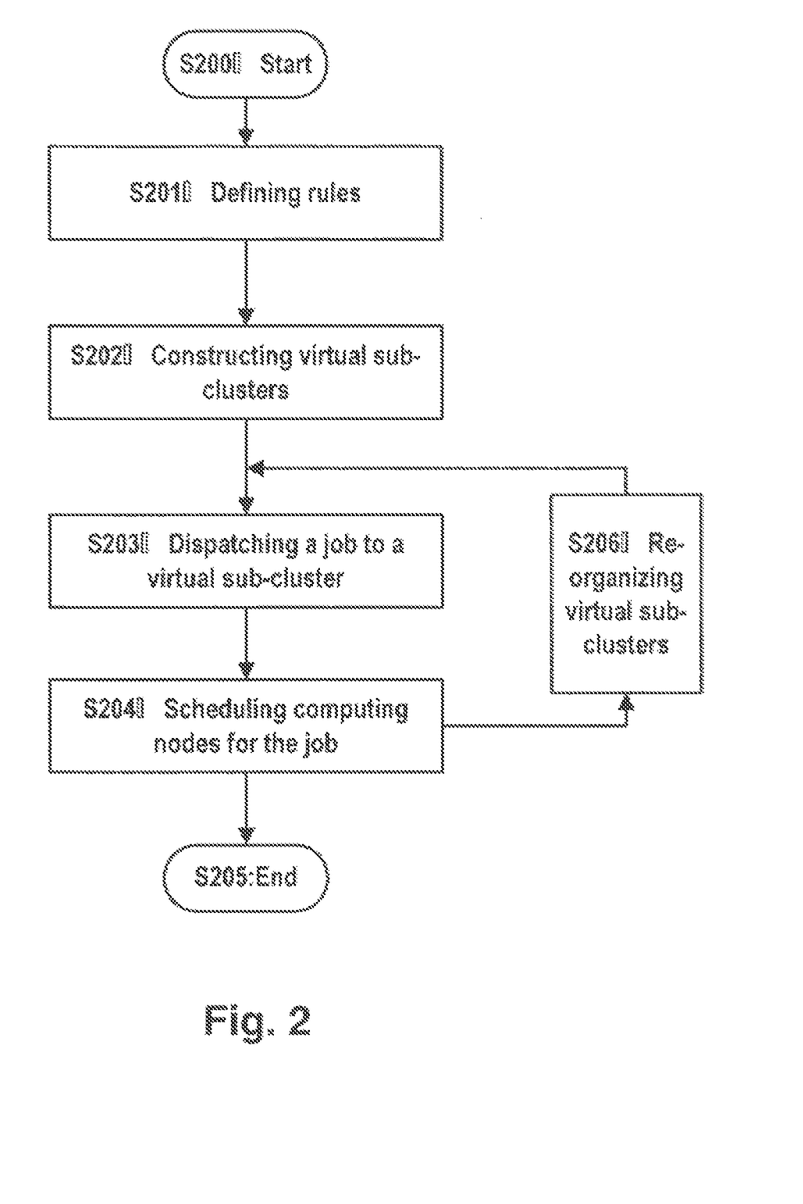
FIG. 2 shows a flow chart of a method for scheduling one or more computing nodes for jobs in a cluster according to embodiments.

FIG. 2 shows a flow chart of a method for scheduling one or more computing nodes for jobs in a cluster according to embodiments.

The method starts at step S200. With the development of techniques, the scale of a cluster is increased steadily, and further there are different types of computing nodes in a cluster. Therefore, at step S201, rules for constructing virtual sub-clusters of computing nodes are defined. Next, at step S202, multiple computing nodes in the cluster are constructed into multiple virtual sub-clusters based on the defined rules. Next, at step S203, a received job is dispatched to one selected virtual sub-cluster after each virtual sub-cluster is constructed based on the defined rules. At step S204, at least one node is scheduled in the virtual sub-cluster for the job. And then, the method can be terminated at step S205.

The step S201 of "defining rules for constructing virtual sub-clusters of computing nodes" in FIG. 2 may utilize characteristics of computing nodes, which may comprise many aspects, for example, two simply-divided classes, static characteristics of computing nodes and dynamic characteristics of computing nodes.

In terms of quantity, static characteristics can comprise characteristics such as the number of CPUs, memories, disks and etc. In terms of type, static characteristics can comprise the type of CPUs, networks, operating systems (OSs) and so on.

Dynamic characteristics can comprise average CPU load, IO load and the like. Dynamic characteristics can further comprise meantime between failure (MTBF) and average replacement rate (ARR) and the like for measuring the reliability of machines.

In one embodiment, defining rules for constructing virtual sub-clusters of computing nodes comprises defining entry rules of virtual sub-clusters. When satisfying an entry rule for a given virtual sub-cluster, a computing node is included into the given virtual sub-cluster. For each of all computing nodes in the cluster, the virtual sub-cluster where it belongs should be determined based on entry rules of respective virtual sub-clusters.

In one embodiment, in the event that a computing node satisfies entry rules of multiple virtual sub-clusters, then it is included into one of the multiple virtual sub-clusters randomly, in the order of designated priorities or according to user-defined policies, that is, one computing node can only be included in one virtual sub-cluster.

In another embodiment, there is a special default virtual sub-cluster. If not satisfying entry rules, of all virtual sub-clusters, a computing node is included into the default virtual sub-cluster.

It should be noted that although such expressions as "one embodiment", "another embodiment", "still another embodiment" and the like are utilized in the description, those skilled in the art should appreciate that features in each embodiment can be combined when there is no conflict.

In actual running process, states of a computing node may change. For example, if a computing node is selected to run computing-intensive jobs, its available resources (for example, CPUs, memories, disks and the like) may be reduced, which may make it unsuitable for computing-intensive jobs.

Therefore, in one embodiment, exit rules can be defined for virtual sub-clusters so as to re-construct virtual sub-clusters. In response that a computing node in a virtual sub-cluster satisfies the exit rule of the virtual sub-cluster due to state changes, the computing node is excluded from the virtual sub-cluster.

Obviously, those skilled in the art may adopt other approaches to solve the problem of state changes of computing nodes. For example, in an alternative embodiment, an exit rule is not otherwise defined, with only the entry rule being applied. In response that a computing node does not satisfy the entry rule of the current virtual sub-cluster where it belongs due to its state changes, the computing node is excluded from the current virtual sub-cluster to which it belongs.

It is determined which virtual sub-cluster the excluded computing node should belong to based on current states of the excluded computing node and the entry rule of each virtual sub-cluster, and then the computing node is included in the determined virtual sub-cluster.

With the above-defined entry rules and/or exit rules, dynamic organizations of virtual sub-clusters can be implemented.

Examples of constructing virtual sub-clusters of computing nodes are given below.

For example, in a cluster mainly applicable to weather forecast, nodes suitable for disk IOs can be combined into a virtual sub-cluster, while nodes appropriate for numerical calculations can be organized into another virtual sub-cluster.

As another example, in a computing center at school, there are usually some computing-intensive jobs as well as experiment applications from students and teachers to be processed. Thus, the entry and exit rules for organizing virtual sub-clusters can be specified as below.

As virtual sub-cluster 1 is directed to computing-intensive jobs, its entry rule for example can be defined as: the number of available CPUs shouldn't be less than 16; the capacity of memory must be higher than or equal to 32 G; and the network bandwidth should not be less than 10 G. It can be described with programming language as below:

(free CPU>=16) AND (Memory>=32 G) AND (network bandwidth>=10 G)

The exit rule of virtual sub-cluster 1 can be defined as: the number of available CPUs should not exceed 2. It can be described with programming language as follows:

(free CPU<=2)

Virtual sub-cluster 2 is related to experiments or program debugging done by students or teachers. Thus, its entry rule for example can be defined as: the number of available CPUs should not be more than 4; and the memory capacity does not exceed 4 G. It is described as follows:

(free CPU<=4) AND (Memory<=4 G)

The exit rule of virtual sub-cluster 2 for example can be defined as: the number of available CPUs should not be less than 8, i.e., (free CPU>=8).

Characteristics of nodes constructing a virtual sub-cluster can be learnt based on rules for constructing the virtual sub-cluster, for example, the number of nodes, characteristics of nodes computing performances (for instance, including but not limited to CPU type, number, topology, graphics processing unit (GPU), accelerator, and so on), characteristics of IO performances of nodes (for example, memory, storage, communication system and the like), OS types of nodes. Different characteristics of virtual sub-clusters can be summarized and classified based on rules for constructing the virtual sub-clusters.

Various virtual sub-clusters are further illustrated as below with examples. However, those skilled in the art can appreciate that the described examples are just for facilitating the understanding of the embodiments, rather than limiting the inventive subject matter to these example applications.

For example, the following types can be obtained based on characteristics of virtual sub-clusters:

AIX virtual sub-cluster: wherein the OSs of nodes are AIX;

64-pathway Power virtual sub-cluster: where each node has a Power CPU with 64 pathways;

BlueGene virtual sub-cluster: where the nodes are of the BlueGene type;

InfiniBand dual-network virtual sub-cluster: where each node connects to two InfiniBand networks and keeps interconnection.

Figure 3:
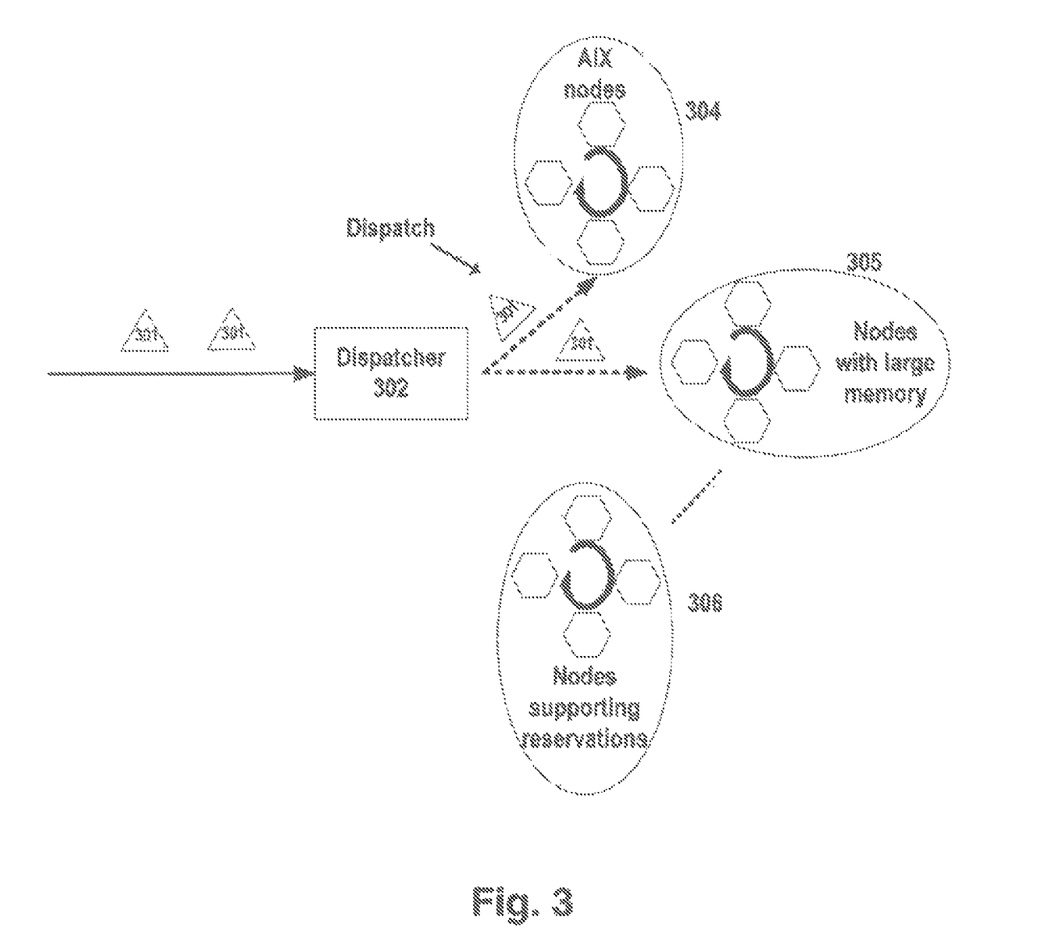
FIG. 3 shows a schematic diagram of a dispatching approach according to embodiments.

FIG. 3 shows the dispatching process according to embodiments with a schematic diagram. Meanwhile, three virtual sub-clusters are illustrated in the example shown in FIG. 3. For example, virtual sub-cluster 304 is composed of AIX nodes supporting AIX OSs. Virtual sub-cluster 305 comprises computing nodes with a large memory. Virtual sub-cluster 306 comprises computing nodes supporting reservations.

As shown in FIG. 3, a job 301 in a job queue enters into a scheduling system to request resources. A dispatcher 302 dispatches the received job 301 to a selected virtual sub-cluster.

There can be various dispatching approaches performed by the dispatcher 302. In an embodiment, the dispatcher 302 can be set to "dispatch jobs among all virtual sub-clusters in the round robin manner". When receiving the submitted job 301, the dispatcher 302 can dispatch it to a selected virtual sub-cluster in the round robin manner. Then, the selected virtual sub-cluster further processes the job 301. Obviously, the dispatcher 302 can be set to dispatch the job among all virtual sub-clusters randomly or in other user-defined manners.

According to embodiments, a great many of computing nodes in the cluster are constructed into multiple virtual sub-clusters. Obviously, the number of virtual sub-clusters is significantly less than the total number of computing nodes. Hence, the dispatcher 302 can dispatch the received job to a selected virtual sub-cluster quickly for further processing.

In another embodiment, different jobs can be dispatched to selected virtual sub-clusters based on their characteristics, with considering different requirements for resources from the different jobs.

For instance, in the field of electric design automation (EDA), some computing applications are formed by combining a lot of short serial programs (such as simulations). Such jobs often have the following requirements for resources which engage computations: a single computing node is involved; and the computing node has a small number of CPUs, such as one or two. Additionally, there are no more requirements for bandwidth and delay among computing nodes since most of the jobs are serial ones. However, there is a high requirement for throughput of the scheduling system because there are many jobs resulted from such applications.

As another example, in the above weather forecast application, the complete process often comprises a pre-processing phase, a calculating phase, and some data post-processing phases. Different phases of weather forecast can be described as multiple jobs which are connected in series in the form of workflow. The job in each execution phase has different requirements for resources.

In the pre-processing phase, lots of observed data should be input, such as satellite cloud picture data, meteorological radar data and the like. Correspondingly, it is required that computing nodes have high IO performances.

Most of the computing phases are computing-intensive parallel programs. As a forecast application, there are restrictions on the time period consumed by the computing processes. Therefore, such jobs usually have the following requirements for nodes: the number of computing nodes matches the application requirements, for example, 64 or 128 nodes may be desired based on different precision requirements; the number of CPUs of each node matches the application requirements, for example, 4, 8 or 32 pathways and etc.; the bandwidth of communication system between nodes must be higher than a certain magnitude (such as 2 Gb) and the delay therebetween should be less than a certain magnitude; and nodes cannot be shared generally and the like.

In view of the above differences, it can be required to describe characteristics of jobs when being submitted according to the embodiment. Information to be described for example comprises but not to limited to the following contents: for instance, source of the job (the jobs come from a certain user, group or domain), the executor of the job, initiating position, estimated execution time, initiating environment and the like.

Specifically, the initiating environment may comprise the number of desired computing nodes, computing performances of nodes, IO performances of nodes and so on.

Through these descriptions, different characteristics of jobs can be summarized and classified. Various jobs are further illustrated as below with examples. However, those skilled in the art can appreciate that the described examples are just for facilitating the understanding of the inventive subject matter, rather than limiting the inventive subject matter to these example applications.

For example, the following types can be obtained based on characteristics of jobs:

experiment jobs, as a non-limiting example, which for example may describe that the jobs come from "students" or other groups, or may describe the jobs come from "researches" field or "production" field;

computing-intensive jobs, which have a high requirement for the number of nodes, such as more than 1024, and demand a large number of CPUs of each node, such as more than 4 pathways;

data-intensive jobs which have high requirements for shared storage space (for example, more than 1 TB), storage spaces of each node (for instance more than 16 G) and IO bandwidth; communication-intensive jobs which require full wire-speed interconnections between nodes and assurance of communication redundancy between nodes;

AIX jobs of which the executor is compiled for AIX system and which require that the OSs of nodes are AIX;

x86 jobs which require that CPU architectures of nodes are x86.

According to the embodiment, as shown in FIG. 3, jobs 301 wait in a job queue to be dispatched; and a dispatcher 302 dispatches them based on characteristics of the received jobs. For example, the dispatcher 302 can be set to "dispatch jobs among all virtual sub-clusters in proportion to the sources of jobs in the round robin manner". Specifically, the dispatcher 302 may dispatch jobs to a certain selected virtual sub-cluster in the ratio of 2:1 based on two sources of the jobs (for example, "production" and "research" fields) among all virtual sub-clusters in the round robin manner. Generally, jobs in the "production" field have higher requirements on time than those in the "research" field. Therefore, in the embodiment, jobs in the "production" field can be assured to have higher throughputs.

Similarly, the round robin manner can be replaced with the random manner or other user-defined manners.

In another embodiment, considering that resource characteristics of computing nodes constructing each virtual sub-cluster are usually different, the received jobs can be dispatched to a selected virtual sub-cluster based on characteristics or types of the virtual sub-clusters.

According to the embodiment, as shown in FIG. 3, jobs 301 wait in a job queue to be dispatched, and a dispatcher 302 dispatches them based on characteristics of virtual sub-clusters. For example, the dispatcher 302 can be set to "dispatch jobs among virtual sub-clusters with more than 10 idle nodes in the round robin manner". Specifically, the dispatcher 302 receives the submitted jobs 301, and dispatches them to virtual sub-clusters with more than 10 idle nodes in the round robin manner without considering the characteristics of jobs. The embodiment increases the utilization of nodes in the conventional round robin manner when compared with the above embodiment.

Likewise, the round robin manner can be replaced with the random manner or other user-defined manners.

In still another embodiment, the dispatching can be implemented based on characteristics of jobs and of virtual sub-clusters. That is, the features of the above two embodiments are integrated.

According to the embodiment, as shown in FIG. 3, jobs 301 wait in a job queue to dispatch; and a dispatcher 302 dispatches them based on characteristics of the received jobs and of the virtual sub-clusters. For example, the dispatcher 302 can be set to "dispatch jobs from the "research" field among all virtual sub-clusters in the round robin manner and dispatch jobs from the "production" field among virtual sub-clusters with more than 10 idle nodes in the round robin manner". Specifically, the dispatcher 302 receives the submitted jobs 301, dispatches them among all virtual sub-clusters in the round robin manner if the jobs belong to the "research" field, and dispatches them among virtual sub-clusters with more than 10 nodes in the round robin manner if the jobs belong to the "production" field. The embodiment increases the utilization of nodes while assuring the throughput of jobs in the "production" field.

It can be seen from the above analysis that different types of computing nodes are usually accommodated to different scheduling policies. Hence, according to an embodiment, each virtual sub-cluster can have its own scheduling policy. In each virtual sub-cluster, at least one computing nodes are scheduled for the dispatched jobs according to its own scheduling policy.

Taken huge computing nodes such as Power servers with 64 pathways as an example, a single node from them has strong capabilities of computing, storing, fault-tolerance and the like, as well as various additional features. Therefore, such nodes are usually expensive. Corresponding scheduling policies emphasize particularly on refinements to increase resource utilizations, such as job Backfill scheduling policy, scheduling policy especial for BlueGene and the like.

A single node from computing nodes with low cost has relative inadequate capabilities of computing, storing, fault-tolerance and the like, and has a few of additional features. However, there a great many of such computing nodes due to the low cost, and their respective scheduling policies tend to be rough, such as Round Robin scheduling policy.

Further, users can define scheduling policies by themselves based on characteristics of computing nodes in the virtual sub-cluster.

For a virtual sub-cluster, the type of dispatched jobs may vary along the time, for example, in the case where the dispatcher is set to "dispatch jobs among all virtual sub-clusters in the round robin manner". According to another embodiment, the scheduling policies for different virtual sub-clusters may be set or adjusted based on characteristics of the dispatched jobs.

There have been optimized scheduling policies for various jobs in the prior art, for example, scheduling policies for parallel jobs, serial jobs, real time jobs, non-real time jobs and the like. As an example, the Backfill scheduling policy is the one for large-scale parallel jobs; the RM scheduling policy is used for real time applications; and the first in first out (FIFO) scheduling policy based on priorities of queues is used for implementing serial jobs and the like. Furthermore, users can define scheduling policies with respect to characteristics of jobs.

The scheduling efficiency in each virtual sub-cluster may be very high when the jobs are scheduled in the selected virtual sub-cluster, since the number of computing nodes in a virtual sub-cluster is evidently less than the total number of computing nodes in the whole cluster. Additionally, the scheduling efficiency and utilization of computing nodes can be further enhanced when a corresponding scheduling policy is adopted with respect to characteristics of computing nodes and/or job types, as each virtual sub-cluster can have its own scheduling policy (or sets or adjusts the scheduling policy based on job types).

Referring to FIG. 2 again, considering the step S204 "scheduling nodes for jobs in a virtual sub-cluster", the method of the invention may further comprise step S206 according to an embodiment. In response that a certain or some computing nodes in the virtual sub-cluster is/are selected to run the dispatched jobs, a portion or all of resources (such as CPUs, memories and disk spaces) of the computing nodes may be consumed, which results in that the computing nodes do not meet the requirements of the virtual sub-cluster where they belong originally. Furthermore, states of computing nodes may change due to some reasons occasionally even if not running jobs. For example, the disconnection from networks or failures of hard disks may result in state changes of computing nodes' resources. Accordingly, at step S206, virtual sub-clusters are re-organized in response to the state changes of computing nodes.

For example, the virtual sub-cluster 1 in the computing center at school which is constructed at step S202 is taken as an example. It is assumed that there is a computing node N of which the characteristics comprise 16 available CPUs, 32 G memory and network bandwidth more than 10 G. The computing node can be included in the virtual sub-cluster 1 based on the entry rule of the virtual sub-cluster 1 defined previously.

When a computing-intensive job requests resources and is dispatched to the virtual sub-cluster 1 by the dispatcher, the computing node N is selected by the scheduler of the virtual sub-cluster 1 to run the job.

It is assumed that the job desires to occupy 14 CPUs and 28 G memory. It can be seen that the states of the computing node N change during running the job, and the remained available resources of the computing node N are not suitable for computing-intensive jobs any more.

According to an embodiment, at step S206, virtual sub-clusters are re-organized based on the defined rules in response to state changes of computing nodes. Those skilled in the art can appreciate that it can be determined whether states of computing resources are changed through collecting state information of the computing resources periodically or through the trigger event of computing resource running jobs.

Based on the rules defined at step S201, virtual sub-clusters can be re-organized based on exit rules of virtual sub-clusters according to an embodiment. Proceed with the previous examples of virtual sub-clusters 1 and 2. It can be seen that there are two available CPUs and 4 G memory of the computing node N remained after its state changes, which makes the computing node N satisfy the exit rule of the virtual sub-cluster 1. Hence, the computing node N is excluded from the virtual sub-cluster 1. It is determined that the computing node N satisfies the entry rule of virtual sub-cluster 2 based on entry rules of other virtual sub-clusters. Therefore, the computing node N is included into the virtual sub-cluster 2. Accordingly, the remained available resources of the computing node N can be used for experiment or debugging jobs from students or teachers, thereby increasing the utilization of resources greatly.

Upon the completion of the job, the occupied resources will be released. Now, the states of the computing node N change again. Similarly, the virtual sub-clusters can be re-organized according to embodiments described previously.

Figure 4:
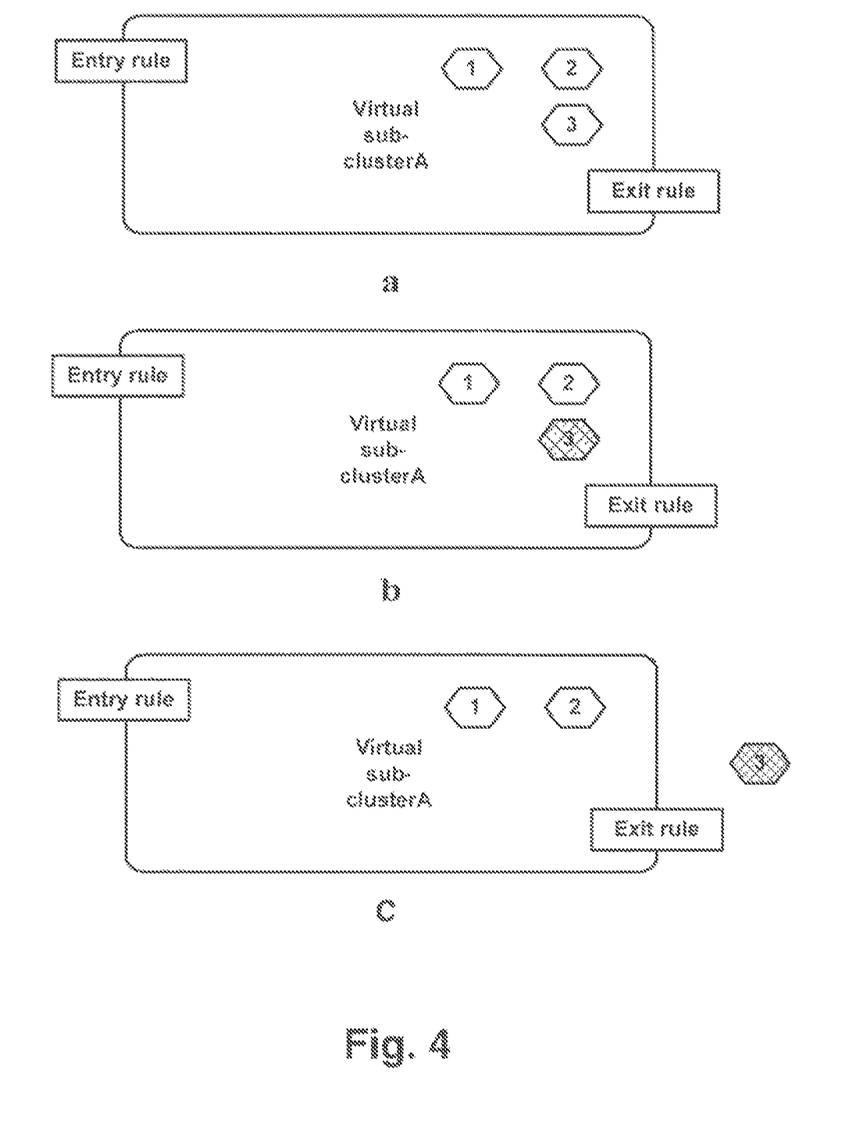
FIGS. 4a-4c shows a schematic diagram of re-organizing virtual sub-clusters.

FIGS. 4a-4c show schematic diagrams of re-organizing virtual sub-clusters according to embodiments.

FIG. 4a shows states of a virtual sub-cluster A at time t1. In the example illustrated in the figure, there are shown three computing nodes 1-3, which satisfy the entry rule of the virtual sub-cluster A and thus are included therein.

FIG. 4b shows the states of virtual sub-cluster A at the later time t2. At time t2, states of computing node 3 change and thus the computing node 3 satisfies the exit rule of the virtual sub-cluster A. Accordingly, the computing node 3 is excluded from the M virtual sub-cluster A.

FIG. 4c shows the states of the virtual sub-cluster A at time t2+.DELTA.t. In the figure, the computing node 3 has not been included in the virtual sub-cluster A. The virtual sub-cluster manager finds another suitable virtual sub-cluster for the excluded computing node 3.

Figure 5:
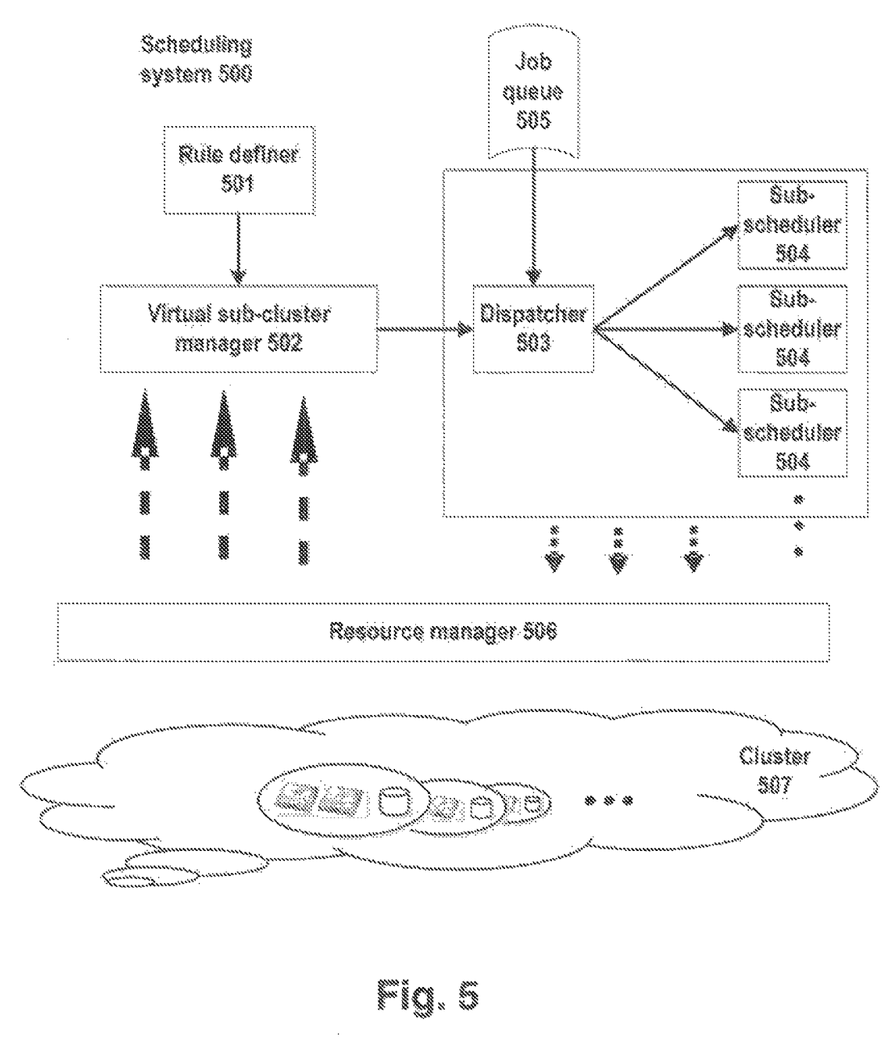
FIG. 5 shows a system architecture according to embodiments.

FIG. 5 shows a system architecture for scheduling jobs in a cluster according to embodiments.

As shown in FIG. 5, according to an embodiment, a scheduling system 500 comprises a rule definer 501 for defining rules for constructing virtual sub-clusters, for example, including entry rules, exit rules of virtual sub-clusters and the like.

The scheduling system 500 further comprises a virtual sub-cluster manager 502 configured for managing constructions and re-organizations of virtual sub-clusters based on the rules defined in the rule definer 501. The dispatcher 503 receives jobs submitted in a job queue 505, and quickly dispatches the received jobs to a selected virtual sub-cluster, that is, to a sub-scheduler 504 of the selected virtual sub-cluster. According to an embodiment, the dispatcher 503 quickly dispatches the jobs based on information about characteristics of each virtual sub-cluster provided by the virtual sub-cluster manager 502. The sub-scheduler 504 schedules at least one computing nodes for the dispatched jobs according to its own scheduling policy.

A resource manager 506 is in charge of maintaining information about characteristics and states of computing nodes in a cluster 507. State information of computing nodes for example may comprise an attribute list describing available resources. In response that the sub-scheduler 504 selects computing nodes in the corresponding virtual sub-cluster to run jobs, the available resources of the selected computing nodes may change, in another word, the states thereof may change. According to an embodiment, the sub-scheduler 504 notifies the resource manager 506 of the information about the selected computing nodes. The resource manager 506 updates attribute lists of the computing nodes, and reports the updated lists to the virtual sub-cluster manager 502. The virtual sub-cluster manager 502 re-organizes the virtual sub-clusters with the above method in response to the state changes of computing nodes.

Although the rule definer 501, virtual sub-cluster manager 502, dispatcher 503, sub-scheduler 504 and the like are shown as separated modules in FIG. 5, those skilled in the art may appreciate that these to modules can be combined in any manner without impacting the implementation of the embodiments. Further, the virtual sub-cluster manager 502 can combined with the resource manager 506.

Figure 6:
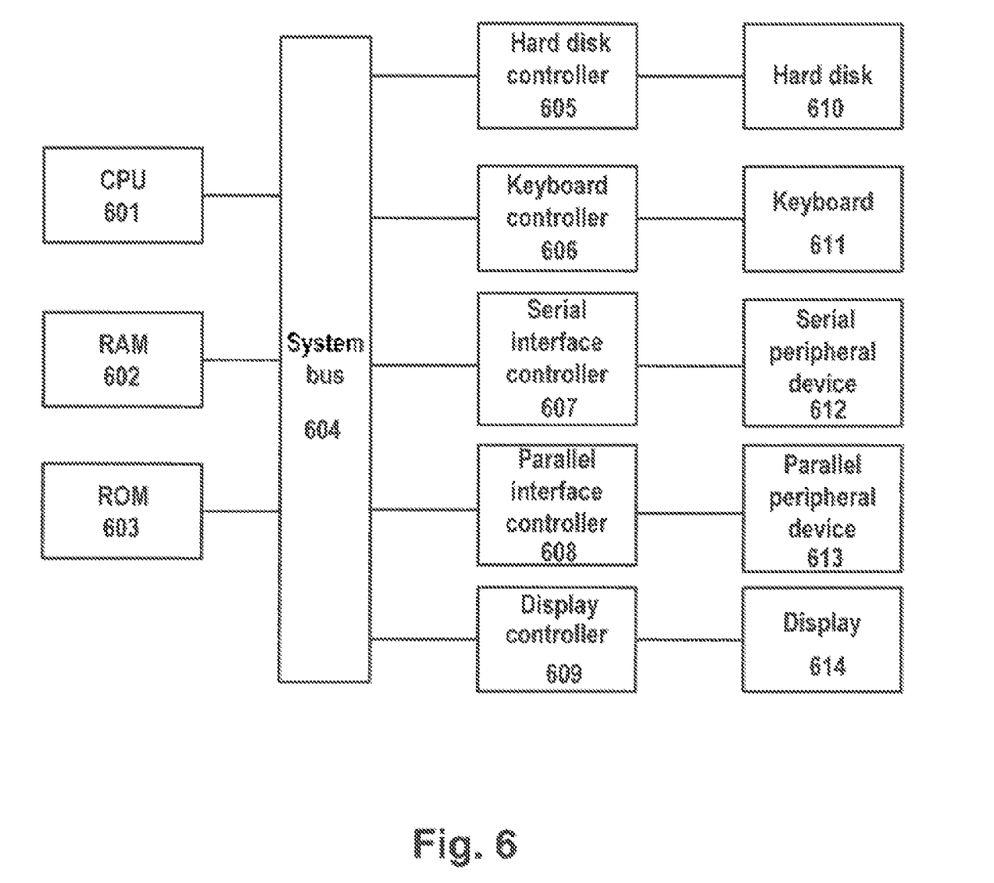
FIG. 6 shows a computer system for implementing the embodiments.

In the following, reference will be made to FIG. 6 to describe a computer system in which the embodiments can be implemented. FIG. 6 schematically illustrates a structural block diagram of a computer system in which an embodiment can be implemented.

The computer system shown in FIG. 6 comprises a CPU (central processing unit) 601, a RAM (random access memory) 602, a ROM (read only memory) 603, a system bus 604, a hard disk controller 605, a keyboard controller 606, a serial interface controller 607, a parallel interface controller 608, a display controller 609, a hard disk 610, a keyboard 611, an serial peripheral device 612, an parallel peripheral device 613 and a display 614. Among these components, connected to the system bus 604 are the CPU 601, the RAM 602, the ROM 603, the hard disk controller 605, the keyboard controller 606, the serial interface controller 607, the parallel controller 608 and the display controller 609. The hard disk 610 is connected to the hard disk controller 605; the keyboard 611 is connected to the keyboard controller 606; the serial peripheral device 612 is connected to the serial interface controller 607; the parallel peripheral device 613 is connected to the parallel interface controller 608; and the display 614 is connected to the display controller 609.

The function of each component shown in FIG. 6 is well known in the art, and the structures shown in FIG. 6 are also customary. The structural block diagram in FIG. 6 is shown only for illustration purpose, is not intended to limit the invention. In some cases, some devices can be added or reduced as required.

Further, those skilled in the art can appreciate that although each aspect of the embodiments are illustrated and described as block diagrams, flow charts or other diagrammatic representations, these modules, components, devices, systems, technologies or methods described herein can be implemented with hardware, software, firmware, application specific circuitry or logic, general hardware or controller or other computing devices or combination thereof as other non-limiting examples.

While the embodiments considered by far have been referred to describe this invention, it should be understood that the invention is not be limited to the embodiments disclosed herein. On the contrary, all modifications and equivalent arrangements that come within the spirit and range of the appended claims are intended to be embraced therein. The scope of the appended claims is accorded with the broadest interpretation to encompass all such modifications and equivalent structures and functions.

What is claimed is:

1. A method for scheduling a job in a cluster including multiple computing nodes, comprising:
    constructing the multiple computing nodes in the cluster into multiple virtual sub-clusters based on rules defining construction of virtual sub-clusters of the multiple computing nodes, the rules including entry rules and exit rules for the multiple virtual sub-clusters, the rules configurable to specify a plurality of characteristics for including a computing node of the multiple computing nodes into a virtual sub-cluster, wherein the plurality of characteristics include at least one member of a group consisting of a number of processors, a memory allocation, and a priority;
    dispatching a received job to a selected virtual sub-cluster;
    scheduling at least one computing node for the received job in the selected virtual sub-cluster; and
    in response to a state change of a computing node, reorganizing the virtual sub-cluster to which the computing node belongs, the reorganizing including:
    determining whether the computing node satisfies an exit rule of the virtual sub-cluster, and
    excluding the computing node from the virtual sub-cluster in response to determining that the computing node satisfies the exit rule.

2. The method of claim 1, wherein dispatching the received job to a selected virtual sub-cluster comprises selecting a virtual sub-cluster to which the job is to be dispatched based on characteristics of the received job and characteristics of the multiple virtual sub-clusters which have been constructed.

3. The method of claim 1, wherein constructing the multiple computing nodes in the cluster into multiple virtual sub-clusters based on the rules comprises:
    in response to a computing node satisfying an entry rule of a virtual sub-cluster, including the computing node into the virtual sub-cluster;
    and in response to a computing node satisfying an exit rule of a virtual sub-cluster, excluding the computing node from the virtual sub-cluster.

4. The method of claim 1, wherein reorganizing the virtual sub-cluster further comprises:
    determining whether the computing node satisfies entry rules of other virtual sub-clusters to determine which virtual sub-cluster the computing node should belong to, and including it into the determined virtual sub-cluster.

5. The method of claim 1, wherein constructing the multiple computing nodes in the cluster into multiple virtual sub-clusters based on the rules comprises:
    responsive to a computing node satisfying entry rules of multiple virtual sub-clusters, associating the computing node into one of the multiple virtual sub-clusters, the associating include one or more of:
    including the computing node into one of the multiple virtual sub-clusters randomly; and
    including the computing node into one of the multiple virtual sub-clusters according to user-defined policies.

6. The method of claim 1, wherein scheduling at least one computing node for the received job in the selected virtual sub-cluster comprises scheduling at least one computing node for the received job according to a scheduling policy of the selected virtual sub-cluster.

7. The method of claim 6, wherein the scheduling policy of the selected virtual sub-cluster is determined based on characteristics of computing nodes in the selected virtual sub-cluster and characteristics of the received job.

8. A system for scheduling a job in a cluster which comprises multiple computing nodes, said system comprising:
    one or more processors;
    a computer-readable storage device communicably coupled to the one or more processors;
    a rule definer executable by the one or more processors from the computer-readable storage device, the rule definer configured to define rules for construction of virtual sub-clusters of the multiple computing nodes, the rules including entry rules and exit rules for one or more of the virtual sub-clusters, the rules configurable to specify a plurality of characteristics for including a node of the multiple computing nodes into a virtual sub-cluster, wherein the plurality of characteristics include at least one member of the group consisting of a number of processors, a memory allocation, and a priority;
    a virtual sub-cluster manager executable by the one or more processors from the computer-readable storage device, the virtual sub-cluster manager configured to construct the multiple computing nodes in the cluster into multiple virtual sub-clusters based on the rules;
    a dispatcher executable by the one or more processors from the computer-readable storage device, the dispatcher configured to dispatch a received job to a selected virtual sub-cluster; and
    a sub-scheduler executable by the one or more processors from the computer-readable storage device, the sub-scheduler configured to schedule at least one computing node for the received job in the selected virtual sub-cluster;
    wherein the virtual sub-cluster manager is further configured to reorganize a virtual sub-cluster in response to a state change of a computing node that belongs to the virtual sub-cluster, the reorganization including the virtual sub-cluster manager configured to:
    determine whether the computing node satisfies an exit rule of the virtual sub-cluster; and
    exclude the computing node from the virtual sub-cluster in response to a determination that the computing node satisfies the exit rule of the virtual sub-cluster.

9. The system of claim 8, wherein the dispatcher is further configured to select a virtual sub-cluster to which the job is to be dispatched based on characteristics of the received job and characteristics of the multiple virtual sub-clusters which have been constructed.

10. The system of claim 8, wherein the virtual sub-cluster manager is further configured to:
    in response to a computing node satisfying an entry rules of a virtual sub-cluster, include the computing node into the virtual sub-cluster; and in response to a computing node satisfying an exit rule of a virtual sub-cluster, exclude the computing node from the virtual sub-cluster.

11. The system of claim 8, wherein the virtual sub-cluster manager is further configured to:
determine whether the computing node satisfies entry rules of other virtual sub-clusters to determine which virtual sub-cluster the computing node with state changes should belong to, and include the computing node into the determined virtual sub-cluster.

12. The system of claim 8, wherein the virtual sub-cluster manager is further configured to:
responsive to satisfaction by a computing node of entry rules of multiple virtual sub-clusters, associate the computing node with one of the multiple virtual sub-clusters, the multiple virtual sub-clusters association including one or more of:
include the computing node into one of the multiple virtual sub-clusters randomly; and
include the computing node into one of the multiple virtual sub-clusters according to user-defined policies.

13. The system of claim 8, wherein the sub-scheduler has a scheduling policy and schedules at least one computing node for the received job based on the scheduling policy.

14. The system of claim 13, wherein the scheduling policy of the sub-scheduler is set based, at least in part, on either or both of characteristics of computing nodes in the selected virtual sub-cluster and characteristics of the received job.

15. A computer-readable storage device having stored thereon computer executable instructions for causing one or more processors to perform operations for scheduling a job in a cluster including multiple computing nodes, the operations comprising:
constructing the multiple computing nodes in the cluster into multiple virtual sub-clusters based on rules defining construction of virtual sub-clusters of the multiple computing nodes, the rules including entry rules and exit rules for the multiple virtual sub-clusters, the rules configurable to specify a plurality of characteristics for including a node of the multiple computing nodes into a virtual sub-cluster, wherein the plurality of characteristics include at least one member of the group consisting of a number of processors, a memory allocation, and a priority;
dispatching a received job to a selected virtual sub-cluster;
scheduling at least one computing node for the received job in the selected virtual sub-cluster; and
in response to a state change of a computing node, reorganizing the virtual sub-cluster to which the computing node belongs, the reorganizing including:

determining whether the computing node satisfies an exit rule of the virtual sub-cluster, and
excluding the computing node from the virtual sub-cluster in response to determining that the computing node satisfies the exit rule.

16. The computer-readable storage device of claim 15, wherein dispatching the received job to a selected virtual sub-cluster comprises selecting a virtual sub-cluster to which the job is to be dispatched based on characteristics of the received job and characteristics of the multiple virtual sub-clusters which have been constructed.

17. The computer-readable storage device of claim 15, wherein constructing the multiple computing nodes in the cluster into multiple virtual sub-clusters based on the rules comprises:
in response to a computing node satisfying an entry rule of a virtual sub-cluster, including the computing node into the virtual sub-cluster;
and in response to a computing node satisfying an exit rule of a virtual sub-cluster, excluding the computing node from the virtual sub-cluster.

18. The computer-readable storage device of claim 15, wherein reorganizing the virtual sub-cluster further includes the operations comprising:
determining whether the computing node with state changes satisfies entry rules of other virtual sub-clusters to determine which virtual sub-cluster the computing node with state changes should belong to, and including it into the determined virtual sub-cluster.

19. The computer-readable storage device of claim 15, wherein constructing the multiple computing nodes in the cluster into multiple virtual sub-clusters based on the rules comprises:
responsive to a computing node satisfying entry rules of multiple virtual sub-clusters, associating the computing node with one of the multiple virtual sub-clusters, the associating including one or more of:
including the computing node into one of the multiple virtual sub-clusters randomly; and
including the computing node into one of the multiple virtual sub-clusters according to user-defined policies.

20. The computer-readable storage device of claim 15, wherein scheduling at least one computing node for the received job in the selected virtual sub-cluster comprises scheduling at least one computing node for the received job according to a scheduling policy of the selected virtual sub-cluster.

* * * * *